United States Patent Office 3,652,604
Patented Mar. 28, 1972

3,652,604
HALOHYDRINS AND PROCESS FOR THE
PREPARATION THEREOF
Rudolf Wiechert, Berlin, Germany, assignor to Schering
Aktiengesellschaft, Berlin, Germany
No Drawing. Filed Mar. 2, 1970, Ser. No. 15,937
Claims priority, application Germany, Mar. 7, 1969,
P 19 12 794.7
Int. Cl. C07c 169/30
U.S. Cl. 260—397.4
19 Claims

ABSTRACT OF THE DISCLOSURE

Epoxides, e.g., steroidal epoxides, are converted to the corresponding halohydrins, by reaction with lithium chloride or lithium bromide in the presence of an aliphatic carboxylic acid.

BACKGROUND OF THE INVENTION

This invention relates to a process for the preparation of halohydrins from epoxides, more particularly to the treatment of epoxides with lithium chloride or lithium bromide.

It is known that epoxides are split by hydrohalic acids. For examples of such epoxide opening in the field of steroids, see, e.g., R. Hirschmann et al., J. Am. Chem. Soc., 84, 1270 (1962); R. Beyler et al., ibid., 82, 178 (1960). However, in many cases the corresponding halohydrins are not obtained as the reaction product. Instead, unsaturated compounds obtained by water being split off are produced and the intermediate halohydrin cannot be isolated. See, e.g., D. N. Kirk et al., J. Chem. Soc., 2385 (1960); O. Mancera and H. J. Ringold, Can. J. Chem., 37, 1785 (1959). An additional disadvantage in such a process is that groups are often present in the starting compound which are sensitive to hydrohalic acids, such as, for example, a methylene, ketal or ester group. Acetic acid has been used to open epoxides to produce diols (Rowland and Nace, ibid., 82, 2833 (1960)) and diol monoacetates (Nambara and Fishman, J. Org. Chem., 27, 2131 (1962)). Chromous chloride has been used to replace an epoxide group with a double bond. See, e.g., S. Bernstein et al., J. Am. Chem. Soc., 81, 4956 (1959); J. S. Mills et al., ibid., 82, 3399 (1960).

SUMMARY OF THE INVENTION

According to this invention, the above-mentioned disadvantages of using hydrohalic acid to open epoxides are avoided by opening the epoxide ring in an organic acid, preferably in an aliphatic carboxylic acid, using lithium chloride or lithium bromide.

DETAILED DISCUSSION OF THE INVENTION

In addition to the advantage that the halohydrin reaction product is not converted to other products during or after the opening of the epoxide ring, a further advantage of the process of this invention is the epoxide ring can be opened under extremely mild reaction conditions. For example, the desired conversion takes place in steroid epoxides at 0–50° C., preferably at 15–25° C. Somewhat lower or higher temperatures can be employed although the yield of desired product may be lower. In general, a reaction time of about 5 to 120 minutes is sufficient for obtaining the desired halohydrin in a practically quantitative yield. Longer or shorter times can be employed depending, in part, on the reaction temperature employed.

The reaction is conducted in the presence of an organic acid. Generally, anhydrous conditions and thus anhydrous acids are employed. A wide variety of organic acids can be employed usually those having a dissociation constant (K) at 25° of at least $10^{-5}$. Preferred are the aliphatic carboxylic acids, and especially the fatty acids, e.g., such as, for example, acetic acid, propionic acid, butyric acid, isobutyric acid, etc.

The amount of acid employed is not critical. Generally a large excess is employed. Conveniently, if the acid is a liquid, it is employed partially or wholly as the reaction solvent.

This smooth progression of the reaction of this invention is the more surprising as other alkali salts, such as, for example, ammonium, potassium, and sodium chloride, or halogenides other than chloride and bromide, such as, for instance, potassium hydrogen fluoride and lithium iodide, as well as solvents other than organic acids, are not effective in the same manner as the process of this invention.

A large molar excess of lithium halide is employed, calculated on the epoxide, e.g., usually at least 10 molar equivalents and preferably at least 25 molar equivalents.

The epoxides which can be opened according to the process of this invention to produce a halohydrin include any epoxide which has heretofore been opened with hydrochloric or hydrobromic acid. Included are acylic and alicyclic epoxides of the formula

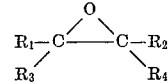

wherein $R_1$ and $R_2$ each are an alkyl group, preferably lower-alkyl, or a hydrogen atom, and $R_3$ and $R_4$ each are a hydrogen atom, an alkyl group, a cycloalkyl group or, collectively, the remainder of a carbocyclic ring containing 3 to 8, preferably 5 or 6 ring carbon atoms, e.g., cyclopentyl, cyclohexyl, cycloheptyl, which can have one, two, three or more carbocyclic rings attached or fused thereto, e.g., octahydroindenyl, decahydronaphthyl, perhydrophenanthryl, perhydroanthracyl, cyclopentanoperhydrophenanthryl. The alkyl and cycloalkyl groups can be unsubstituted or substituted, e.g., with alkyl, preferably lower-alkyl, e.g., methyl, halo, e.g., chloro, bromo, fluoro, hydroxy, esterified hydroxy, preferably lower-alkanoyloxy, e.g., acetoxy, benzoxy, etherified hydroxy, preferably lower-alkoxy, e.g., methoxy, benzyloxy, tetrahydropyranyloxy, keto, ketalized keto, preferably di-lower-alkoxy, e.g., di-ethoxy, or lower-alkylene-dioxy, e.g., ethylenedioxy, other epoxy groups, double bonds, nitro, methylene, sulfato, groups, etc.

A preferred class of starting compounds are those in which the epoxide group is present in a gonane structure, i.e., a steroid, including those in which either or both of the angular methyl groups at the 10- and 13-position are absent or replaced by another lower-alkyl group, e.g., ethyl, propyl or isopropyl.

The epoxide group can be present in any possible location of the steroid molecule, for example, in the 1,2-, 2,3-, 3,4-, 4,5-, 5,6-, 6,7-, 7,8-, 8,14-, 9,11-, 11,12-, 14,15-, 15,16-, 16,17-, 17,20-, or 20,21-position; in this connection, it is also possible for several epoxide groups to be present in the steroid molecule, e.g., 5,6- and 9,11- or 16,17-positions. The epoxide groups can be in the α- or β-position. Furthermore, as stated above, the steroid molecule can contain other substituents customary in steroids.

Examples of other such substituents are free, esterified or etherified hydroxy groups, for example in the 3-, 11-, 16-, and/or 21-position; free or functionally modified, e.g., ketalized, keto groups, for example in the 3- and/or 6-position; alkyl, preferably lower-alkyl groups, for example in the 1-, 7-, 16-, and/or 18-position; alkenyl or alkynyl groups, for example in the 17-position; halogen atoms, for example in the 2-, 4-, 6-, 7-, 9-, 16-, and/or 21-position. If a hydrogen atom is present in the 5-position, it can be in either the 5α- or 5β-configuration.

Many of the halohydrin steroids which can be prepared in accordance with the process of this invention are known. See, e.g., Djerassi, "Steroid Reactions," Holden-Day, Inc., Publishers (1963) pp. 615-622. Halohydrins have been used in steroid chemistry as intermediates in the production of a variety of types of compounds. For example, chlorohydrins and bromohydrins have been used, e.g., as intermediates in the synthesis of 17α-hydroxy-20-keto steroids from $\Delta^{16}$-20-keto steroids; 9α-fluoro-11β-hydroxy steroids from $\Delta^{9(11)}$ and 11α- and 11β-hydroxy steroids; 11-hydroxy steroids from $\Delta^{11}$ steroids; 6-chloro and 7-chloro steroids; and generally are useful wherever it is desired to introduce a hydroxy and/or halo group in the steroid molecule. The process of this invention can, for example, be used to produce halohydrins useful in the production of highly active gestagens, such as, for example, 17-hexanoyloxy-4-pregnene-3,20-dione, 6-chloro-17 - acetoxy-4,6-pregnadiene-3, 20-dione, 6-chloro-17-acetoxy-16α - methyl-4,6-pregnadiene-3,20-dione, and 6-chloro-17-methyl-4,6-pregnadiene-3,20-dione; in the production of valuable testosterone antagonists, such as, for example, 6-chloro-17-acetoxy-1α,2α-methylene-4,6-pregnadiene-3,20-dione; and in the production of corticoids, such as, for example, of 6α-fluoro-9-chloro-11β,21-dihydroxy - 1,4-pregnadiene-3,20-dione.

With the selections of the appropriate starting compounds, the halohydrins produced by the process of this invention can also be employed directly as effective pharmacological agents. Thus, the process of this invention can be used to produce novel 6α-halo-7β-hydroxy-17α-acyloxy-1α,2α-methylene-4-pregnene-3,20-diones of the formula

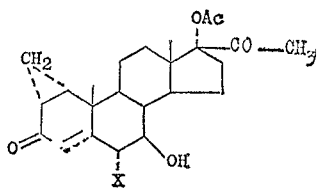

wherein X is Cl or Br and Ac is the acyl radical of an acid, preferably an organic carboxylic acid containing from 1 to 12 carbon atoms, inclusive, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, which can be optically active, e.g., abietic, an alicyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β - cyclohexylpropionic, an aryl or alkaryl acid, e.g., benzoic, 2,3 or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylacetic, α-naphthoic, 3-methyl-α-naphthoic, an aralkyl acid, e.g., phenylacetic, phenylpropionic, diphenylacetic, triphenylacetic acid.

The novel 6α-halo-7β-hydroxy - 17α-acyloxy-1α,2α-methylene-4-pregnene-3,20-diones of this invention are highly effective gestagens, especially upon oral administration. For example, compared with the known gestagens 17-hydroxy-17α-ethynyl-4-estren-3-one (II) and 17α-acetoxy-1α,2α-methylene-4-pregnene-3,20-dione (I), 6α-chloro-17β-hydroxy-17α - acetoxy - 1α,2α-methylene-4-pregnene-3,20-dione (III), is more effective, as can be seen from the following table.

TABLE I

| Compound | Clauberg test (per os) threshold value (mg.) | Inhibition of ovulation (per os) $ED_{50}$ (mg.) |
|---|---|---|
| I........ 17α-acetoxy-1α,2α-methylene-4-pregnene-3,20-dione. | 0.10 | 3.0 |
| II....... 17-Hydroxy-17α-ethynyl-4-estren-3-one. | 0.13 | 3.0 |
| III...... 6α-chloro-7β-hydroxy-17α-acetoxy-1α,2α-methylene-4-pregnene-3,20-dione. | 0.003 | [1] 3.0 |

[1] Inactive.

The gastagenic effect was determined in the conventional Clauberg test on rabbits. The threshold value was the total dosage effecting, in at least two out of three test animals, a secretory conversion of the endometrium. The inhibition of ovulation was tested by tube inspection in rats, wherein the dosage was determined which suppresses ovulation in 50% of the test animals.

It can be seen from the table that compound III of this invention has a peripheral gestagenic effectiveness which is 30–40 times stronger than that of the comparison substances I and II. Moreover, the central inhibitory effect of Compound III is very minor.

One aspect of this invention is the use of the novel compounds of this invention in the treatment of gynecologic disturbances, such as, for example, primary amenorrhea and secondary amenorrhea of longer duration, cyclic disturbances in case of insufficient corpus luteum function, dysfunctional hemorrhages, endometriosis, hypoplasia of the uterus, pruritus, premenstrual complaints, and mastopathy.

According to this use aspect of the invention, a 1α,2α-methylene-6α-halo-7β-hydroxy compound of this invention, in a pharmaceutically acceptable formulation, i.e., as a mixture with a pharmaceutical carrier, is administered systemically to a mammal in which a gestagenic effect is desired, in an amount sufficient to cause the desired gestagenic effect to be manifested.

The dosage is determined in accordance with the gravity of the illness. In general, the daily administration usually is between 5 and 100 mg.

For therapeutic use, the novel effective agents can be formulated into conventional drug forms with the additives, carrier substances, and flavoring agents customary in pharmaceutical preparations which do not deleteriously react with the effective agents, employing conventional methods. For oral application, which is preferred, particularly suitable are tablets, dragées, capsules, pills, suspensions and solutions. For parenteral application, preferred are oily solutions, e.g., sesame oil solutions or castor oil solutions which can optionally contain, additionally, a diluent, such as, for example, benzyl benzoate or benzyl alcohol. Such compositions can employ, for example, water, alcohol, polyethylene glycols, gelatin, sucrose, lactose, amylose in solutions and suspensions and magnesium stearate, talc, starch, sugars, etc., in tablets. The concentration of the effective agent in the thus-formulated medicines is dependent on the type of administration. Generally, they contain about 5–100 mg. of a compound of this invention and 1–5,000 mg. of a pharmaceutical carrier per unit dose.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

One gram of 17-acetoxy-6α,7α-epoxy-1α,2α-methylene-4-pregnene-3,20-dione is stirred for 15 minutes at room temperature in 30 ml. of acetic acid with 5.0 g. of lithium chloride. Then, the reaction mixture is stirred into ice water and the thus-separated precipitate is vacuum-filtered, washed neutral, and dried. After recrystallization from ethyl acetate, 780 mg. of 6β-chloro-7α-hydroxy-17-acetoxy - 1α,2α - methylene-4-pregnene-3,20-dione is obtained, M.P. 130.5–134° C. UV: $\epsilon_{235}=10,800$.

EXAMPLE 2

1.5 g. of 17-acetoxy - 6β,7β - epoxy-1α,2α-methylene-4-pregnene-3,20-dione is reacted analogously to Example 1, and worked up. After recrystallization from ethyl acetate, 1.31 g. of 6α-chloro-7β-hydroxy-17-acetoxy-1α,2α-methylene-4-pregnene-3,20-dione is obtained, M.P. 220–221° C. (decomposition). UV: $\epsilon_{235}=12,900$.

EXAMPLE 3

600 mg. of 3β-acetoxy-5,6α-epoxy-5α-pregn-16-en-20-one is stirred for 1½ hours at room temperature in 20 ml. of formic acid with 3.0 g. of lithium chloride, and worked up analogously to Example 1. After recrystallization from ethyl acetate, 350 mg. of 6β-chloro-5-hydroxy-3β-acetoxy-5α-pregn-16-en-20-one is obtained, M.P. 229–233° C. (decomposition). UV: $\epsilon_{239}=9,040$.

EXAMPLE 4

500 mg. of 3β-acetoxy-16α,17-epoxy-5-pregnen-20-one is reacted in acetic acid with lithium chloride, analogously to Example 1, and worked up. After recrystallization from isopropyl ether, 350 mg. of 16β-chloro-17-hydroxy-3β-acetoxy - 5 - pregnen-20-one is obtained, M.P. 167–169° C.

EXAMPLE 5

500 mg. of 3β-acetoxy-16α,17-epoxy-5-pregnen-20-one is stirred for 15 minutes at room temperature in 10 ml. of acetic acid with 2.5 g. of lithium bromide. After recrystallization from isopropyl ether, 380 mg. of 16β-bromo-17-hydroxy-3β-acetoxy - 5 - pregnen-20-one, M.P. 156–158° C., is obtained.

EXAMPLE 6

200 mg. of 17-hydroxy - 21 - acetoxy-9,11β-epoxy-9β-pregn-4-ene-3,20-dione is reacted in acetic acid with lithium chloride, analogously to Example 1, and worked up. After recrystallization from methanol, 125 mg. of 9-chloro-11β,17-dihydroxy-21-acetoxy - 4 - pregnene-3,20-dione is obtained, M.P. 185–187° C. (decomposition). UV: $\epsilon_{241}=16,500$.

EXAMPLE 7

500 mg. of 17β-acetoxy-1α,2α-epoxy-5α-androstan-3-one is stirred for 15 minutes at room temperature in 15 ml. of propionic acid with 2.5 g. of lithium bromide, and worked up analogously to Example 1. After recrystallization from isopropyl ether, 370 mg. of 2β-bromo-1α-hydroxy-17β-acetoxy-5α-androstan-3-one is obtained, M.P. 175.5–178° C.

EXAMPLE 8

2.0 g. of 17-acetoxy-6β,7β-epoxy-1α,2α-methylene-4-pregnene-3,20-dione is stirred for 5 minutes at room temperature in 60 ml. of acetic acid with 10 g. of lithium bromide. The reaction mixture is worked up in accordance with Example 1. After chromatographing on silica gel and recrystallization from ethyl acetate, 1.2 g. of 6α-bromo-7β-hydroxy-17-acetoxy-1α,2α-methylene - 4 - pregnene-3,20-dione is obtained, M.P. 216–218° C. UV: $\epsilon_{236}=12,500$.

EXAMPLE 9

One gram of 4-chloro-17-acetoxy-6α-7α-epoxy-4-pregnene-3,20-dione is reacted analogously to Example 1 for over 2 hours at room temperature and then worked up. After recrystallization from isopropyl ether, 850 mg. of 4,6β-dichloro - 7α - hydroxy-17-acetoxy-4-pregnene-3,20-dione is obtained, M.P. 228.5–229.5° C. (decomposition). UV: $\epsilon_{259}=11,800$.

EXAMPLE 10

500 mg. of 4-chloro - 17 - acetoxy-6β,7β-epoxy-16α-methyl-4-pregnene-3,20-dione is reacted analogously to Example 1 for over 75 minutes at room temperature, and worked up. After recrystallization from acetone/hexane, 380 mg. of 4,6α-dichloro-7β-hydroxy - 17 - acetoxy-16α-methyl-4-pregnene-3,20-dione is obtained, M.P. 176.5–177.5° C. (decomposition). UV: $\epsilon_{261}=10,900$.

EXAMPLE 11

500 mg. of 17β - acetoxy - 6α,7α - epoxy-17α-ethynyl-4-estren-3-one is reacted and worked up analogously to Example 1, thus obtaining 350 mg. of 6β-chloro-7α-hydroxy - 17β - acetoxy - 17α - ethynyl - 4 - estren - 3 - one. UV: $\epsilon_{240}=14,100$.

EXAMPLE 12

500 mg. of 4-chloro - 17 - acetoxy - 6β,7β - epoxy-1α,2α - methylene - 4 - pregnene - 3,20 - dione is reacted analogously to Example 1 for over 2 hours at room temperature, and worked up, thus obtaining 310 mg. of 4,6α - dichloro - 7β - hydroxy - 17 - acetoxy - 1α,2α-methylene-4-pregnene-3,20-dione. UV: $\epsilon_{260}=9,500$.

EXAMPLE 13

7 g. of 6α,7α - epoxy - 1α,2α;16α,17 - dimethylene-4-pregnene-3,20-dione is reacted in 70 ml. of acetic acid with 30 g. of lithium chloride, analogously to Example 1, and worked up. After recrystallization from methanol, 6.5 g. of 6β - chloro - 7α - hydroxy - 1α,2α;16α,17 - dimethylene - 4 - pregnene - 3,20 - dione is obtained, M.P. 228–229° C. (decomposition). UV: $\epsilon_{235}=12,900$.

The preciding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is caimed is:

1. A process for the preparation of steroidal halohydrins from epoxides which comprises reacting a steroidal epoxide with lithium chloride or lithium bromide in the presence of an aliphatic carboxylic acid.
2. A process according to claim 1 wherein the reaction is conducted at a temperature of about 0 to 50° C.
3. A process according to claim 2 wherein the reaction is conducted at about room temperature.
4. A process according to claim 1 wherein the aliphatic acid is acetic acid.
5. A process according to claim 4 wherein the acetic acid is employed as the solvent.
6. A process according to claim 4 wherein the reaction is conducted at about room temperature.
7. A process according to claim 1 wherein chloride is employed.
8. A process according to claim 4 wherein lithium chloride is employed.
9. A process according to claim 5 wherein lithium chloride is employed.
10. A process according to claim 1 wherein the steroidal epoxide is a 5,6-epoxide.
11. A process according to claim 1 wherein the steroidal epoxide is a 6,7-epoxide.
12. A process according to claim 1 wherein the steroidal epoxide is a 9,11-epoxide.
13. A process according to claim 1 wherein the steroidal epoxide is a 16,17-epoxide.
14. A process according to claim 1 wherein the steroidal epoxide is a 17 - acyloxy - 6,7 - epoxy - 1α,2α-methylene - 4 - pregnene - 3,20 - dione in which the acyl radical of the 17-acyloxy group is the acyl radical of an organic carboxylic acid containing from 1 to 12 carbon atoms.

15. A process according to claim 14 wherein the acyl radical is acetoxy.

16. A process according to claim 15 wherein lithium chloride is employed.

17. A compound of the formula

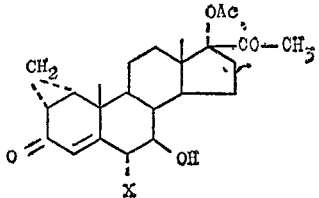

wherein X is chlorine or bromine and Ac is the acyl radical of an organic carboxylic acid containing from 1 to 12 carbon atoms, inclusive.

18. A compound of claim 17, 6α - chloro - 7β - hydroxy - 17α - acetoxy - 1α,2α - methylene - 4 - pregnene-3,20-dione.

19. A compound of claim 17, 6α - bromo - 7β - hydroxy - 17α - acetoxy - 1α,2α - methylene - 4 - pregnene-3,20-dione.

References Cited

UNITED STATES PATENTS 3,231,569   1/1966   Krakower _____ 260—239.55
3,439,093   4/1969   Hader et al. _____ 424—243

HENRY A. FRENCH, Primary Examiner

U.S. Cl. X.R.

260—999

UNITED STATES PATENT OFFICE
CERTIFICATE OF CORRECTION

Patent No. 3,652,604　　　　　　Dated March 28, 1972

Inventor(s) Rudolf Wiechert

It is certified that error appears in the above-identified patent and that said Letters Patent are hereby corrected as shown below:

Claim 7, column 6, after "wherein" insert -- lithium --.

This certificate supersedes the Certificates of Corrections issued July 31, 1973 and September 25, 1973.

Signed and sealed this 23rd day of April 1974.

(SEAL)
Attest:

EDWARD M. FLETCHER, JR.　　　　　　C. MARSHALL DANN
Attesting Officer　　　　　　　　　　Commissioner of Patents